United States Patent [19]

Umemura

[11] Patent Number: 5,426,159
[45] Date of Patent: Jun. 20, 1995

[54] PROCESS FOR PRODUCING GRAFTED POLYCARBONATE RESIN

[75] Inventor: Toshikazu Umemura, Toyonaka, Japan

[73] Assignee: Mitsubishi Gas Chemical Company, Inc., Tokyo, Japan

[21] Appl. No.: 91,756

[22] Filed: Jul. 15, 1993

Related U.S. Application Data

[63] Continuation-in-part of Ser. No. 903,157, Jun. 24, 1992, abandoned.

[30] Foreign Application Priority Data

Jun. 27, 1991 [JP] Japan .................. 3-182933

[51] Int. Cl.⁶ .................. C08F 283/02; C08L 69/00
[52] U.S. Cl. .................. 525/468; 525/467
[58] Field of Search .................. 525/468

[56] References Cited

U.S. PATENT DOCUMENTS

| | | |
|---|---|---|
| 3,692,870 | 9/1972 | Schnell et al. . |
| 4,310,642 | 1/1982 | Margotte et al. .................. 525/468 |
| 4,888,401 | 12/1993 | Kawaki et al. .................. 525/468 |

FOREIGN PATENT DOCUMENTS

| | | |
|---|---|---|
| 1720645 | 6/1971 | Germany . |
| 53-31796 | 3/1978 | Japan . |
| 54-117555 | 9/1979 | Japan . |
| 63-15822 | 1/1988 | Japan . |

OTHER PUBLICATIONS

Chemical Abstract 92(6):42814y.
Chemical Abstract 89(6):44656k.
Chemical Abstracts, vol. 92, No. 6, 1980, Columbus, Ohio US; Abstract No. 42814Y, Kakizaki et al.; "Improved Blending of Polycarbonate With Polystyrene", p. 31, column 2; & JP-A-54117555 (Mitsubishi Petrochemical Co.) Dec. 9, 1979.

*Primary Examiner*—David Buttner
*Attorney, Agent, or Firm*—Sughrue, Mion, Zinn, Macpeak & Seas

[57] ABSTRACT

Disclosed is a process for producing a grafted polycarbonate resin for optical use, which comprises adding to an aqueous suspension of an aromatic polycarbonate resin having radical-polymerizable unsaturated terminal group on a molecule wherein the aromatic polycarbonate resin has an average particle diameter of 0.1 to 5 mm and an apparent density of 0.2 to 0.9 g/cm³, a vinyl monomer and a radical-polymerization initiator, heating the aqueous suspension at a lower temperature by 5° C. to 20° C. than the decomposition temperature for a half-life period of 10 hours of the radical-polymerization initiator, thereby impregnating the polycarbonate resin with the vinyl monomer and the radical-polymerization initiator, then elevating the temperature to the range of from a lower temperature by 50° C. to a higher temperature by 30° C. than the decomposition temperature for a half-life period of 10 hours of the radical-polymerization initiator, thereby conducting a graft-polymerization reaction to obtain 90% by weight or more of conversion of vinyl monomer.

10 Claims, 3 Drawing Sheets

PROCESS FOR PRODUCING GRAFTED POLYCARBONATE RESIN

This is a Continuation-in-Part of application No. 07/903,157 filed Jun. 24, 1992.

BACKGROUND OF THE INVENTION

1. Field of the Invention

This invention relates to a process for producing a polycarbonate resin having good transparency and flowability, obtained by graft polymerization of an aromatic polycarbonate resin having at least one unsaturated terminal group with a vinyl monomer and provides a useful resin composition for optical uses such as optical discs, optical lenses and prisms.

2. Prior Art

So far known materials for optically transparent molded products include acrylic resin because of its distinguished characteristics such as good transparency and flowability and small birefringence [Japanese Patent Application Kokai(Laid-Open) No. 56-131654]. However, acrylic resin has a low heat resistance such as about 70° C., a low impact resistance and a liability to warp due to moisture as disadvantages. To overcome these disadvantages it was proposed to use polycarbonate resin having a viscometric average molecular weight of 15,000 to 18,000 as molding materials for optical discs or lenses [Japanese Patent Application Kokai (Laid-open) No. 58-180553], but the proposed polycarbonate is not satisfactory in the flowability and still has a limit to its application.

To improve the flowability of polycarbonate resin, it was proposed to melt blend the polycarbonate resin with other thermoplastic resin such as polystyrene, polymethylmethacrylate, acrylonitrile-styrene copolymer (AS resin), maleic anhydride-styrene copolymer, etc., but it was difficult to make the sizes of dispersed particles less than 1 μm due to the non-compatibility, resulting in optical un-uniformity. It was also proposed to use a vinylic monomer as a solvent for the polycarbonate resin and conduct bulk polymerization [Japanese Patent Application Kokai (Laid-open) No. 63-196612], where dispersed particles having sizes of less than 0.2 μm could be obtained, but a larger amount of the solvent must be used, resulting in a costly disadvantage.

Moreover, Japanese Patent Application Kokai (Laid-open) Nos.54-117,555 and 53-31,796 disclose a process for producing a modified polycarbonate resin which comprises impregnating an aromatic polycarbonate resin with a vinyl monomer or a vinylidene monomer in an aqueous solvent to maintain an amount of free monomer to 50% by weight or below and then elevating the temperature of the aqueous dispersion liquid to polymerize the monomer. However, the thus obtained modified polycarbonate is insufficient for optical use.

SUMMARY OF THE INVENTION

It is an object of the present invention to provide a process for producing a commercially producible, grafted polycarbonate resin for optical use.

That is, the present invention relates to a process for producing a grafted polycarbonate resin for optical use which comprises adding to an aqueous suspension of an aromatic polycarbonate resin having radical-polymerizable unsaturated terminal group on a molecule wherein the aromatic polycarbonate resin has an average particle diameter of 0.1 to 5 mm and an apparent density of 0.2 to 0.9 g/cm$^3$, 20 to 200 parts by weight of a vinyl monomer on the basis of 100 parts by weight of the polycarbonate resin and 0.5 to 5 parts by weight of a radical-polymerization initiator on the basis of 100 parts by weight of the vinyl monomer, heating the aqueous suspension for 15 minutes to 4 hours at a lower temperature by 5° to 20° C. than the decomposition temperature for a halE-life period of 10 hours of the radical-polymerization initiator, thereby impregnating the polycarbonate resin with the vinyl monomer and the radical-polymerization initiator then elevating the temperature to the range of from a lower temperature by 5° C. to a higher temperature by 30° C. than the decomposition temperature for a half-life period of 90 hours of the radical-polymezization initiator, thereby conducting a graft-polymerization reaction of polycarbonate and vinyl monomer for 1 to 20 hours to obtain 90% by weight or more of conversion of vinyl monomer.

Further, the grafted polymer may be melt-kneaded at the temperature of 200° C. to 350° C. for pelleteization.

BRIEF DESCRIPTION OF THE DRAWINGS

FIGS. 1 and 2 are transmission electorn micrographs of an ultra thin film of the test piece (x 10,000) which show a state of dispersion of polycarbonate and polystyrene in the grafted polycarbonate resin of this invention.

FIG. 3 is a transmission electron micrograph of an ultra thin film of the test piece (x 10,000) which shows a state of dispersion of polycarbonate resin and polystyrene of a kneaded composition by melt-mixing. (Comparative Example).

DETAILED DESCRIPTION OF THE INVENTION

The present invention will be explained in detail below.

An aromatic polycarbonate resin having radical-polymerizable unsaturated terminal group on molecule in the present invention can be prepared by aqueous emulsion polymerization using a monofunctional compound having an unsaturated double bond as a compound for introducing the radical polymerizable unsaturated terminal group or a termination agent or together with a conventional terminating agent in the same procedure for preparing the conventional aromatic polycarbonate resin as solution procedures, for example, interfacial polymerization procedure, a pyridine procedure and a chloroformate procedure. The aromatic polycarbonate resin thus prepared has a viscometric average molecular weight of 2,000 to 100,000, preferably 5,000 to 50,000, more preferably 6,000 to 30,000, most preferably 12,000 to 22,000. In the case of a low molecular weight, coagulation between particles easily occurs during polymerization while in the case of a high molecular weight, optical performances deteriorate since a concentration of unsaturated terminal group decreases. The thus prepared polycarbonate resin can be solidified and recovered from the polycarbonate resin solution after the reaction according to various procedures, for example, a procedure for adding a poor solvent, for example, a lower aliphatic alcohol including methanol, ethanol, propanol and iso-propanol; a saturated hydrocarbon including n-hexane and n-heptane to the polycarbonate resin solution, thereby precipitating the polycarbonate resin, a procedure for distilling off the solvent from the polycarbonate resin solution, thereby concentrating the solution into powdery polycarbonate resin, and a procedure for adding a poor solvent to the polycarbonate resin solution, pouring the resulting mixture into hot water with heating, thereby suspending the polycarbonate resin in the hot water, distilling off the solvent and the poor solvent, thereby solidifying the polycarbonate resin to form an aqueous slurry, and recycling to a wet mill the aqueous slurry in the solidification process and grinding it. In the present invention, it is rational and preferable to use an aqueous slurry of polycarbonte resin as an aqueous suspension of polycarbonate resin.

Preferable dihydric phenol compounds for use in the preparation of the present ploycarbonate resin include, for example, bis(4-hyroxyphenyl)methane, bis(4-hydroxyphenyl)ether, bis(4-hydroxyphenyl)sulfone, bis(4-hyroxyphenyl)sulfoxide, bis(4-hydroxyphenyl)suliide, bis(4-hydroxyphenyl)ketone, 1,1-bis(4-hydroxyphenyl)ethane, 2,2-bis(4-hydroxyphenyl)propane, 2,2-bis(4-hydroxyphenyl)butane, 1,1-bis(4-hyroxyphenyl)cyclohexane, 2,2-bis(4-hyroxy-3,5-dibromophenyl)propane, 2,2-bis(4-hyroxy-3,5-dichlorophenyl)-propane, 2,2-bis(4-hyroxy-3-bromophenyl)propane, 2,2-bis(4-hyroxy-3-chlorophenyl)propane, 2,2-bis(4-hyroxy-3,5-dimethylphenyl)propane, 1,1-bis(4-hyroxyphenyl)-1-phenylethane, and bis(4-hyroxyphenyl)diphenylmethane.

The monofunctional compounds having an unsaturated double bond for introducing an unsaturated terminal group includes, for example, phenols containing an unsaturated group such as eugenol, iso-eugenol, p-hydroxy methyl cinnamate, isopropenylphenol, hydroxystyrene, hydroxyphenylmaleimide; hydroxysubstituted methacrylate such as 2-hydroxy ethylmethacrylate, 2-hydroxy propylmethacrylate; unsaturated carboxylic acids such as acrylic acid, methacrylic acid, vinylacetic acid, 2-pentenoic acid, 3-pentenoic acid, 5-hexanoic acid, 9-decenoic acid, and 9-undecenoic acid; acid chlorides or chloroformates such as acrylic chloride, methacrylic chloride, sorbic chloride, allyl alcohol chlorotormate, isopropenylphenol chloroformate and hyroxystyrene chloroformate; benzoic acid containing an unsaturated group such as acryroxy benozoic acid, methacryroxy benzoic acid. Among these compounds, the phenols containing unsaturated group are preferred, and these compounds may be used together with the conventional terminating agent and are usually used in a range of 1 to 25% by mole, preferably 1.5 to 10% by mole, on the basis of one mole of the dihydric phenol compound.

As the conventional terminating agent, phenols are, generally, used such as phenol, alkylphenol having alkyl group of 1 to 18 carbon atoms, alkyl ester substituted phenol having alkyl group of 1 to 18 carbon atoms, halogenated phenol and cumylphenol.

In the process for producing the aromatic polycarbonate resin of this invention, the grafting ratio may be controlled by changing an amount of the introducing unsaturated terminal group, using the compound having an unsaturated double bond together with conventional terminating agent, considering the reactivity of unsaturated terminal group.

The amount of conventional terminating agent may be used in a range of 0 to 30 mole, preferably, 0 to 15 mole per mole of unsaturated compound for introducing radical-polymerizable unsaturated terminal group to aromatic polycarbonate resin.

The polycarbonate resin for use in the present invention is prepared from the above-mentioned components as essential ones, but 0.01 to 3% by mole, particularly 0.1 to 1.0% by mole, of a branching agent may be used together on the basis of the dihydric phenol compound to make a branched polycarbonate resin. The branching agent includes, for example, polyhydroxy compounds such as fluoroglycine, 2,6-dimethyl-2,4,6-tri(4-hydroxyphenyl)heptane-3, 4,6-dimethyl-2,4,6-tri-(4-hydroxyphenyl)heptane-2, 1,3,5-tri(2-hydroxyphenyl)benzene, 1,1,1-tri-(4-hydroxyphenyl)ethane, 2,6-bis(2-hydroxy-5-methylbenzyl)-4-methylphenol, and $\alpha,\alpha'\alpha''$-tri(4-hydroxyphenyl)-1,3,5-triisopropylbenzene, and 3,3-bis(4-hydroxyallyl)oxyindol(=isatinbisphenol), 5-chloroisatin, 5,7-bromoisatin and 5-bromoisatin.

The aromatic polycarbonate resin in the present invention is preferably in such a shape as a powdery form having particle sizes of 0.1 to 5 mm as an average particle diameter and an apparent density of 0.2 to 0.9 $g/cm^3$, preferably 0.5 to 0.85 $g/cm^3$. When the particle size is excessively large, not only dispersion in a suspension becomes difficult, but also the time for impregnation with the vinyl monomer and radical-polymerization initiator, etc. will be prolonged.

Moreover, when particles of the aromatic polycarbonate resin are porous, impregnation of particles with the vinyl monomer easily occurs. The porosity of particles of the aromatic polycarbonate resin has intimate relations with an apparent density. When the apparent density is high, it is difficult to impregnate uniformly and optically satisfactory products cannot be obtained. On the other hand, when the apparent density is too low, it is difficult in handling and productivity deteriorates.

The vinyl monomer for use in the present invention is preferably stable in water and insoluble in water and has a lower affinity for water, and is, for example, at least one member selected from the group consisting of vinyl aromatic monomers, substituted maleimides, fumaric acid esters, maleic acid esters, acrylic acid ester monomers or methacrylic acid ester monomers, acrylonitrile or methacrylonitrile, glycidyl methacrylate and vinyl ester monomers. The vinyl aromatic monomers include, for example, styrene; alkyl-substituted styrenes such as o-methylstyrene, p-methylstyrene, $\alpha$-methylstyrene, o-butylstyrene, p-butylstyrene and 2,4-dimethylstyrene; and halogenated styrene such as chlorostyrene and bromostyrene. The acrylic acid ester monomers or methacrylic ester monomers include, for example, alkyl methacrylates such as methyl methacrylate, ethyl methacrylate, cyclohexyl methacrylate, alkylacrylate such as butyl acrylate, n-hexyl acrylate. The substituted maleimides include, ior example, maleimide, N-methylmaleimide, N-ethylmaleimide, N-propylmaleimide. The fumaric acid esters include, ior example, diethyl fumarate, dimethyl fumarate, diisopropyl fumarate. The maleic acid esters include, for example, dimethyl maleate, diethyl maleate, dipropyl maleate. The vinyl monomer is preferably styrene and substituted styrenes, and is used in a range of 20 to 200 parts by weight, preferably 50 to 150 parts by weight, on the basis of 100 parts by weight of the polycarbonate resin. Thus, in respect to the amount for use of the vinyl monomer, an optimum range exists. When the amount of the vinyl monomer is too large or too small, low double rearactivity necessary for optical use deteriorates.

In the present invention, a molecular weight-controlling agent can be used for the vinyl monomer. Suitable molecular weight-controlling agent are organic sulfur compounds, which are, for example, aliphatic compounds having 1 to 30 carbon atoms or aromatic compounds, specifically aliphatic mercaptans such as n-octylmercaptane and n-dodecylmercaptane, tert-dodecylmercaptane, hexadecylmercaptane, n-octadecylmercaptane; aromatic mercaptanes, thioglycolic acid and its esters, ethylene thioglycolic acid and its esters and ethylene glycol. The molecular weight-controlling agent is used in a range of 0.0001 to 5 parts by weight, preferably 0.01 to 1 parts by weight, on the basis of 100 parts by weight of the vinyl monomer.

The radical-polymerization initiator for use in the present invention is the one having a decomposition temperature for a half-life period of 10 hours being 40 to 100° C., preferably 60° to 95° C. The decomposition temperature for a half-life period of 10 hours is a temperature at which 0.1 mole of a radical-polymerization initiator added to 1L of benzene is decomposed to 50% just after 10 hours. The radical-polymerization initiator includes, for example, diisopropyl peroxydicarbonate, di-n-propyl peroxydicarbonate, dimyristyl peroxycarbonate, di-(2-ethoxyethyl) peroxydicarbonate, di-(methoxyisopropyl)peroxydicarbonate, di-(2-ethylhexyl)-peroxydicarbonate, t-hexyl peroxyneodecanoate, di-(3-methyl-3-methoxybutyl)peroxydicarbonate, t-butyl peroxyneodecanoate, t-hexyl peroxyneohexanoate, t-butyl peroxyhexanoate, 2,4-dichlorobenzoyl peroxide, t-hexyl peroxypivalate, t-butyl peroxypivalate, 3,5,5-trimethylhexanoyl peroxide, octanoyl peroxide, lauroyl peroxide, cumyl peroxyoctoate, acetyl peroxide, t-butyl peroxy-2-ethylhexanoate, m-tolnoyl peroxide, benzoyl peroxide, t-butyl peroxyisobutyrate, and 1,1-bis(t-butyl-peroxy)-3,5,5-trimethylcyclohexane. The radical-polymerization initiator is used in a range of 0.1 to 5 parts by weight, preferably 0.5 to 5 parts by weight, on the basis of 100 parts by weight of the vinyl monomer.

According to the present invention, the polycarbonate resin, the vinyl monomer and the radical-polymerization initiator are suspended in an aqueous medium, and the resulting aqueous suspension is heated to a temperature, at which no substantial decomposition of the radical-polymerization initiator takes place, thereby impregnating the polycarbonate resin with the vinyl monomer and the radical-polymerization initiator, and then the temperature is elevated to conduct graft polymerization thereby to form a grafted polycarbonate. A suspending agent such as polyvinyl alcohol, polyvinyl-pyrrolidone, methyl cellulose, or other water-soluble polymers and calcium phosphate, magnesium oxide and other water-soluble inorganic substances can be added to the aqueous medium. Reactants such as the polycarbonate, etc. in the aqueous suspension can be at any desired concentration, but usually the reactants are in a range of 5 to 100 parts by weight on the basis of 100 parts by weight of water.

In the present invention, it is preferable to impregnate the polycarbonate resin with the vinyl monomer and the radical-polymerization initiator at a temperature as high as possible, but it is necessary to do so at such a temperature that no substantial decomposition of the radical-polymerization initiator takes place, because, the radical-poymerization initiator is decomposed during the impregnation, the grafted polycarbonate obtained will have an un-uniform polymer. It is preferable that the impregnation temperature is by 5° to 20° C. lower than the decomposition temperature for a half-life period of hours of the radical-polymerization initiator. When the impregnation time is too long, it is not preferable since productivity deteriorates and thermal polymerization of vinyl monomer occurs. The impregnation time is suitably minutes to 4 hours, preferably within 2 hours.

Then, the temperature of the aqueous suspension is quickly elevated to a temperature, at which the decomposition of the radical-polymerization initiator starts, thereby conducting graft polymerization to form a grafted polycarbonate. In the graft polymerization, a temperature must be kept to the range of from a lower temperature by 5° C. to a higher temperature by 30° C. than the decomposition temperature for a half-life period of 10 hours of the radical-polymerization initiator. The reaction time is preferably within 1 to 20 hours. Under such conditions, 90% by weight or more of the vinyl monomer is converted.

In the present invention, it is necessary to maintain the conversion of vinyl monomer to 90% by weight or more of the initial charge at the end of reaction, because if an amount of the remaining unreacted vinyl monomer is more than 10% by weight, it is impossible to obtain a polycarbonate resin having good optical performances.

Moreover, the reaction temperature and time must be selected in such a condition that an amount of the radical-polymerization initiator becomes 20% by weight or less and preferably 10% by weight or less. If the amount of the remaining radical-polymerization initiator is large, depolymerization occurs during the pelletization process and strength of the product decreases. After the graft reaction, the grafted polymer is recovered from the aqueous suspension by liquid-solid separation and, if necessary, washed with water, hot water, or the like and dried.

Thus obtained grafted polycarbonate includes occasionally unreacted vinyl-monomer so that the grafted polymer is melt-kneaded at a temperature of 200° to 350° C. to complete grafting, whereby a grafted polycarbonate resin is obtained. The melt-kneading can be carried out at the above-mentioned temperature either batchwise or continuously, for example, by a bambury mixer, an extruder, an injection molding machine or the like. It is also possible to recover a portion of unreacted monomer by distillation under reduced pressure during the melt-kneading. A vinyl monomer which is unstable in water or has a high affinity for water, such as maleic anhydride, acrylic acid, methacrylic acid, or N-phenyl-maleimide can be melt-kneaded with the grafted polycarbonate, where it is preferable to mix these components in advance and keep the mixture for a desired time to make aging and uniform dispersion. It is also possible to use ordinary polycarbonate resin or together with polystyrene, polymethylmethacrylate or AS resin thereto during the melt-kneading, using grafted polycarbonate resin composition as an agent for making the components compatible (hereinafter referred to as compatibilizer), thereby make a polymer alloy.

The grafted polycarbonate resin prepared according to the present invention can be used in various applications. For example, it is particularly suitable as optical polycarbonate molding materials when styrene is used as a vinyl monomer and useful as a compatibilizer and useful as a surface coating primer for polycarbonate resin when styrene, methacrylate or acrylate is used. By using the present grafted polycarbonate resin as a compatibilizer, microfinely dispersed polymer alloys such as those of polycarbonate resin-styrene grafted polycarbonate resin styrene/maleic anhydride copolymer, polycarbonate resin-acrylonitrile grafted polycarbonate resin polymethylmethacrylate, etc. can be obtained.

DESCRIPTION OF THE PREFERRED EMBODIMENTS

Example 1

3.4 kg of sodium hydroxide was dissolved in 4.2 l of water, and further 6.6 kg of 2,2-bis(4-hydroxyphenyl) propane (=BPA) and 8 g of hydrosulfite were dissolved in the solution, while keeping the solution at 20° C. Then, 28 l of methylene chloride was added thereto and 250 g of p-isopropenylphenol was added thereto with stirring. Then, 3.3 kg of phosgene was fed therein over 60 minutes.

After the feeding of phosgene, the reaction solution was vigorously stirred to emulsify it, and thereafter 8 g of triethylamine was added thereto and the emulsion was stirred for about one hour to conduct polymerization.

The resulting polymerization solution was separated into an aqueous phase and an organic phase, and the organic phase was neutralized with phosphoric acid and repeatedly washed with water until the pH of washing water became neutral. Then, 35 l of isopropanol was added to precipitate the polymers. Then, the precipitates were recovered therefrom by filtration and vacuum dried, whereby white powdery polycarbonate resin was obtained.

The particle diameter was measured by a sieving method according to JIS R 6002. As a result, the average particle diameter was 1.5 mm and the apparent density was 0.65 g/cm$^3$.

The apparent density was determined at 25° C. by the following formula, using 100 ml of a measuring flask.

$$\frac{W(PC)}{100 - W(water)/\rho}$$

$W(PC)$: weight(g) of PC
$W(water)$: weight(g) of water
$\rho$: density(g/cm$^3$) of water As a result of measuring the viscosity of the polycarbonate resin, it was found that the viscometric average molecular weight (Mv) was 16,000.

500 g of powder of the terminally unsaturated polycarbonate resin were placed in a stainless steel autoclave having a net volume of 5 l, and 2,500 ml of deionized water was added thereto. Then, 6.0 g of benzoyl peroxide (temperature for a half-life period of 10 hours: 74° C.) as a radical-polymerization initiator, 300 g of styrene monomer and 0.2 g of n-dodecylmercaptane as a molecular weight-controlling agent were added thereto. Then, the mixture was stirred for 2 hours, while keeping the temperature of the autoclave at 60°-65° C. to impregnate the powder of the terminally unsaturated polycarbonate with the radical-polymerization initiator, styrene and n-dodecylmercaptane. Then, the temperature of the autoclave was elevated to 90° C. and stirring was continued for 7 hours. At that time, 99% of the radical-polymerization initiator was decomposed and 99.5% of styrene monomer was converted.

Polymer powder was recovered from the suspension, washed with hot water and made thoroughly free from the washing water. The resulting polymer powder had a water content of 8% by weight. The wet polymer powder was fed to a vent-type, twin screw extruder, 30 mm in shaft diameter with L/D=32, and extruded at a resin temperature of 280° C. to obtain pellets.

The pellets thus obtained were transparent and substantially did not contain styrene monomer.

A disk of thickness 3 mm was prepared by injection molding and then total transmittance/haze (T/H) was measured by a hazemeter (1001DP manufactured by NIPPON DENSHOKU KOGYO CO. LTD). The T/H value was 87.6%/2.5%

The pellets were cut by ultramicrotome to prepare a test piece of width 0.5 mm, length 0.5 mm and thickness 0.1 μm. The test piece was colored with RuO$_4$.

Further, a morphology of the polymer was observed with transmission electron microscopy (TEM) (JEM-2000FX manufactured by JEOL LTD.).

The dispersed particles had 0.2 to 1.0 μm of diameter and a good state of dispersion was observed.

Figure 1:
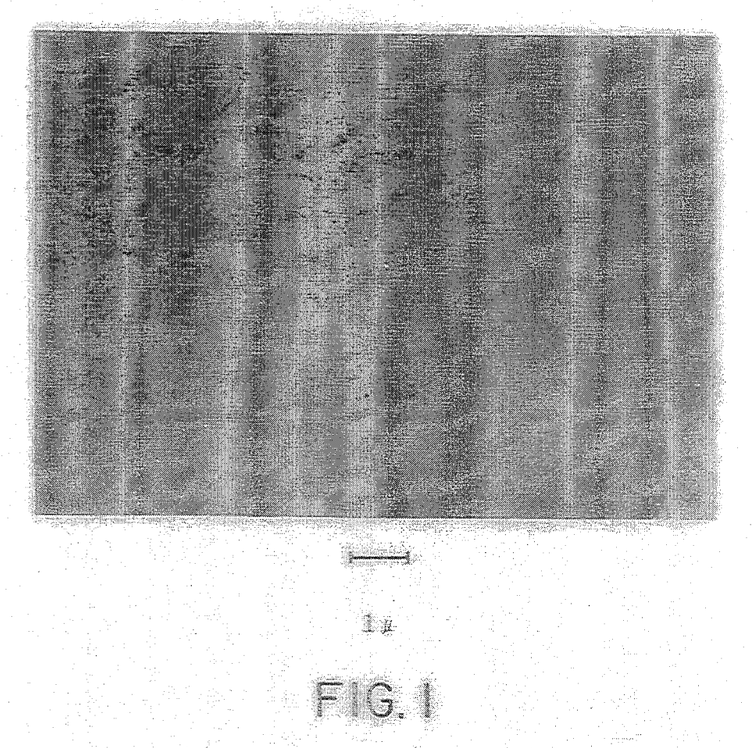
FIGS. 1 to 3 each shows a state of dispersion of a polycarbonate resin and polystyrene.

A transmission electron micrograph of an ultra thin film of the best piece(x 10,000) is shown in FIG. 1.

Example 2

4.0 kg of sodium hydroxide was dissolved in 4.2 l of water, and then 7.3 kg of 2,2-bis(4-hydroxyphenyl) propane (=BPA) and 8 g of hydrosulfite were dissolved therein, while keeping the solution at 20° C. Then, 28 l of methylene chloride was added thereto, and 4.4 kg of phosgene was injected therein over 60 minutes.

After the injection of phosgene, 460 g of acrylic acid and 73 g of tetrabutylammonium bromide were added thereto, and the reaction solution was vigorously stirred to emulsify it. 20 minutes after the emulsification, 8 g of triethylamine was added thereto and stirring was continued for about one hour to conduct polymerization.

The resulting polymerization solution was separated into an aqueous phase and an organic phase, and the organic phase was neutralized with phosphoric acid and repeatedly washed with water until the pH of the washing water became neutral. Then, 35 l of isopropanol was added thereto to precipitate polymers. The precipitates were recovered therefrom by filtration and vacuum dried, whereby white powdery polycarbonate resin was obtained. The average particle diameter of thus obtained polycarbonate resin was 1.4 mm and the apparent density was 0.68g/cm$^3$.

As a result of determination of the viscosity of the polycarbonate resin, it was found that the viscometric average molecular weight was 16,000.

500 g of the powder of the terminally unsaturated polycarbonate were placed in a stainless steel autoclave having a net volume of 5 l, and 2,500 ml of deionized water was added thereto. Then, 6.0 g of benzoyl peroxide(temperature for a half-life period of 10 hours: 74° C.) as a radical-polymerization initiator and 300 g of methyl methacrylate were added thereto. The mixture was stirred for 2 hours to impregnate the terminally unsaturated polycarbonate resin with the radical-polymerization initiator and methyl methacrylate, with stirring for 2 hours, while keeping the autoclave at 60° C.. Then, the temperature was elevated to 90° C. and stirring was continued for 4 hours. At that time, 75% of the radical-polymerization initiator was decomposed and 90% of methyl methacrylate monomer was converted.

The polymer powder was recovered from the suspension, washed with hot water and made thoroughly free from the washing water. The resulting polymer powder had a water content of 8% by weight. The wet polymer was fed to a vent-type, twin screw extruder, 30 mm in shaft diameter with L/D=32, and extruded at a resin temperature of 250° C. to obtain pellets.

The pellets thus obtained were transparent and substantially did not contain styrene monomer.

A disk of thickness 3 mm was prepared by injection molding and then total transmittance/haze (T/H) was measured by a hazemeter (1001 DP manufactured by NIPPON DENSHOKU KOGYO CO. LTD). The T/H value was 87.9%/2.4%.

A test piece was prepared and colored in the same manner as in Example 1.

Further, a morphology of the polymer was observed with transmission electron microscopy (TEM) (JEM-2000FX manufactured by JEOL LTD.).

The dispersion particles had 0.2 to 0.7 μm of diameter and a good state of dispersion was observed.

Example 3

Polycarbonate resin having unsaturated terminal group was obtained in the same manner as in Example 1 except that 25 g of p-isopropenylphenol as a functional compound for introducing unsaturated terminal group and 225 g of p-t-butylephenol as a terminating agent were added.

As a result of measuring the viscosity of the polycarbonate resin, it was found that the viscomtric average molecular weight (Mv) was 17,000.

The average particle diameter thus obtained polycarbonate resin was 1.7 mm and the apparent density was 0.64g/cm$^3$.

500 g of powder of the terminally unsaturated polycarbonate resin were placed in a stainless steel autoclave having a net volume of 5 ° C., and 2,500 ml oi deionized water was added, thereto. Then, 10 g of t-butyl peroxy-2-ethylhexanoate (temperature for a half-life period of 10 hours: 72.5° C.) as a radical-polymerization initiator, 500 g of styrene monomer and 0.2 g of n-octylmercaptane as a molecular weight-controlling agent were added thereto. Then, the mixture was stirred for 2 hours, while keeping the temperature of the autoclave at 60°-65° C. to impregnate the powder of the terminally unsaturated polycarbonate with the radical-polymerization initiator, styrene and n-octylmercaptaneo Then, the temperature of the autoclave was elevated to 90° C. and stirring was continued for 5 hours. At that time, more than 90% of styrene monomer was converted.

Polymer powder was recovered from the suspension, washed with hot water and then dried at 100° C. for 10 hours with nitrogen. 960 g of the resulting polymer powder was obtained. The wet polymer powder was fed to the same vent-type, twin screw extruder as used in Example 1, and extruded at a resin temperature of 280° C. to obtain pellets. The pellets thus obtained were transparent and substantially did not contain styrene monomer. A disk of thickness 3 mm was prepared by injection molding in the same manner as in Example 1 and then total transmittance/haze (T/H) was measured by a hazemeter (1001DP manufactured by NIPPON DENSHOKU KOGYO CO. LTD.). The T/H value was 88.0%/2.0%.

A test piece was prepared and colored in the same manner as in Example 1.

Further, a morphology of the polymer was observed with transmission electron microscopy (TEM) (JEM-2000FX manufactured by JEOL LTD.).

The dispersed particles had 0.2–0.5μm of diameter and a good state of dispersion was observed.

Figure 2:
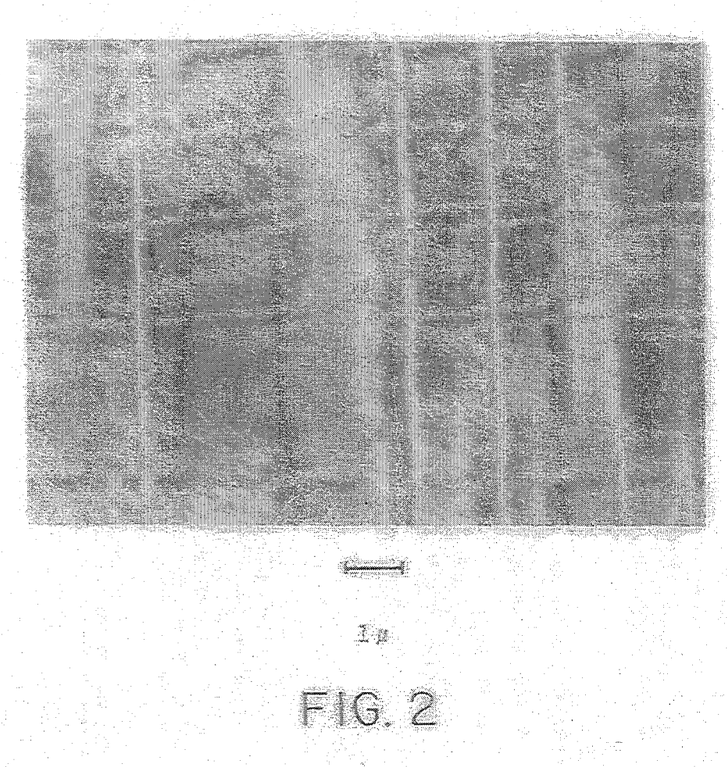

A transmission electron micrograph an ultra thin film oi the test piece (x 10,000) is shown in FIG. 2.

Example 4

Polycarbonate resin having unsaturated terminal group was obtained in the same manner as in Example 1 except that 306 g of eugenol as a functional compound for introducing unsaturated terminal group was used.

As a result of measuring the viscosity of the polycarbonate resin, it was found that the viscometric average molecular weight (My) was 15,000.

The average particle diameter thus obtained polycarbonate resin was 1.5 mm and the apparent density was 0.67 g/cm$^3$.

500 g of powder of the terminally unsaturated polycarbonate resin were placed in a stainless steel autoclave having a net volume of 5 l, and 2,500 ml of deionized water was added thereto. Then, 10 g of benzoyl peroxide (temperature for a half-life period of 10 hours: 74° C.) as a radical-polymerization initiator, 500 g of styrene monomer and 0.2 g of n-dodecylmercaptane as a molecular weight-controlling agent were added thereto. Then, the mixture was stirred for 2 hours, while keeping the temperature of the autoclave at 60°-65° C. to impregnate the powder of the terminally unsaturated polycarbonate with the radical-polymerization initiator, styrene and n-dodecylmercaptane. Then, the temperature of the autoclave was elevated to 90° C. and stirring was continued for 5 hours. At that time, more than 90% of styrene monomer was converted.

970 g of polymer powder was obtained in the same manner as in Example 3. The wet polymer powder was fed to the same vent-type, twin screw extruder as used in Example 1, and extruded at a resin temperature of 240° C. to obtain pellets.

The pellets thus obtained were transparent and substantially did not contain styrene monomer. A disk oi thickness 3 mm was prepared by injection molding in the same manner as in Example 1 and then total transmittance/haze (T/H) was measured by a hazemeter (1001 DP manufactured by NIPPON DENSHOKU KOGYO CO.,LTD.). The T/H value was 88.0%/1.9%.

A test piece was prepared and colored in the same manner as in Example 1.

Further, a morphology of the polymer was observed with transmission electron microscopy (TEM) (JEM-2000FX manufactured by JEOL LTD.).

The dispersed particles had 0.2–0.7 μm of diameter and a good state of dispersion was observed.

Example 5

Polycarbonate resin having unsaturated terminal group was obtained in the same manner as in Example 1 except that 250 g of o-allylphenol as a functional compound for introducing unsaturated terminal group were used.

As a result of measuring the viscosity of the polycarbonate resin, it was found that the viscometric average molecular weight (Mv) was 15,000.

The average particle diameter of thus obtained polycarbonate resin was 1.9 mm and the apparent density was 0.68g/cm$^3$.

500 g of powder of the terminally unsaturated polycarbonate resin were placed in a stainless steel autoclave having a net volume of 5 l, and 2,500 ml of deionized water was added thereto. Then, 70 g of cumylperoxyoctoate (temperature for a half-life period of 10 hours: 65.1° C.) as a radical-polymerization initiator, 500 g of styrene monomer and 0.2 g of n-dodecylmercaptane as a molecular weight-controlling agent were added thereto. Then, the mixture was stirred for 2 hours, while keeping the temperature of the autoclave at 60°–65° C. to impregnate the powder of the terminally unsaturated polycarbonate with the radical-polymerization initiator, styrene and n-dodecylmercaptane. Then, the temperature of the autoclave was elevated to 90° C. and stirring was continued for 5 hours. At that time, more than 90% of styrene monomer was converted.

960 g of polymer powder was obtained in the same manner as in Example 3. The wet polymer powder was fed to the same vent-type, twin screw extruder as used in Example 1, and extruded at a resin temperature of 240° C. to obtain pellets.

The pellets thus obtained were transparent and substantially did not contain styrene monomer. A disk of thickness 3 mm was prepared by injection molding in the same manner as in Example 1 and then total transmittance/haze (T/H) was measured by a hazemeter (1001 DP manufactured by NIPPON DENSHOKU KOGYO CO.). The T/H value was 87.8%/2.3%.

A test piece was prepared and colored in the same manner as in Example 1.

Further, a morphology of the polymer was observed with transmission electron microscopy (TEM) (JEM-2000FX manufactured by JEOL LTD.).

The dispersed particles had 0.2–0.8 $\mu$m of diameter and a good state of dispersion was observed.

Example 6

Polycarbonate resin having unsaturated terminal group was obtained in the same manner as in Example 1 except that 306 g of eugenol as a functional compound for introducing unsaturated terminal group was used.

As a result of measuring the viscosity of the polycarbonate resin, it was found that the viscometric average molecular weight (Mv) was 17,000.

The average particle diameter of thus obtained polycarbonate resin was 1.8 mm and the apparent density was 0.65 g/cm$^3$.

500 g of powder of the terminally unsaturated polycarbonate resin were placed in a stainless steel autoclave having a net volume of 5 l, and 2,500 ml of deionized water was added thereto. Then, 10 g of benzoyl peroxide (temperature for a half-life period of 10 hours: 74° C.) as a radical-polymerization initiator, 500 g of styrene monomer and 100 g of N-cyclohexylmaleimide and 0.2 g of n-dodecylmercaptane as a molecular weight-controlling agent were added thereto. Then, the mixture was stirred for 2 hours, while keeping the temperature of the autocalve at 60°–65° C. to impregnate the powder of the terminally unsaturated polycarbonate with the radical-polymerization initiator, styrene, N-cyclohexylmaleimide and n-dodecylmercaptane. Then, the temperature of the autoclave was elevated to 90° C. and stirring was continued for 5 hours. At that time, more than 90% of styrene monomer and N-cyclohexylmaleimide monomer was converted.

1046 g of polymer powder was obtained in the same manner as in Example 3. The wet polymer powder was fed to the same vent-type, twin screw extruder as used in Example 1, and extruded at a resin temperature of 240° C. to obtain pellets.

The pellets thus obtained were transparent and substantially did not contain styrene monomer. A disk of thickness 3 mm was prepared by injection molding in the same manner as in Example 1 and then total transmittance/haze (T/H) was measured by a hazemeter (1007 DP manufactured by NIPPON DENSHOKU KOGYO CO.,LTD.). The T/H value was 87.0%/2.0%.

A test piece was prepared and colored in the same manner as in Example 1.

Further, a morphology of the polymer was observed with transmission electron microscopy (TEM) (JEM-2000FX manufactured by Japan Electric Co.).

The dispersed particles had 0.2–0.8 $\mu$m of diameter and a good state of dispersion was observed.

Comparative Example 1

1 kg of Polycarbonate resin, Iupilon H-4000 (produced by Mitsubishi Gas Chemical Co., Inc.) and 1 kg of Polystyrene, Dialex (produced by Mitsubishi Monsanto Kasei Co.) were mixed with tumbler mixer in a dry state.

Then, the mixed polymer was fed to a vent-type twin screw extruder, 30 mm in shaft diameter with LD=32, and extruded at resin temperature of 250° C. to obtain pellets.

Thus obtained resin pellets were injected into the mold to prepare a disk of 3 mm thickness. T/H of this disk was measured by haze meter (1001DP, manufactured by NIPPON DENSHOKU LTD.). The T/H was 87.3%/54.9%

A test piece was prepared and colored in the same manner as in Example 1. Mothology of polymer were observed by TEM (JEM-2000FX, manufactured by JEOL LTS.).

The dispersion was not uniform and dispersion particles were more than 10 $\mu$m.

Figure 3:
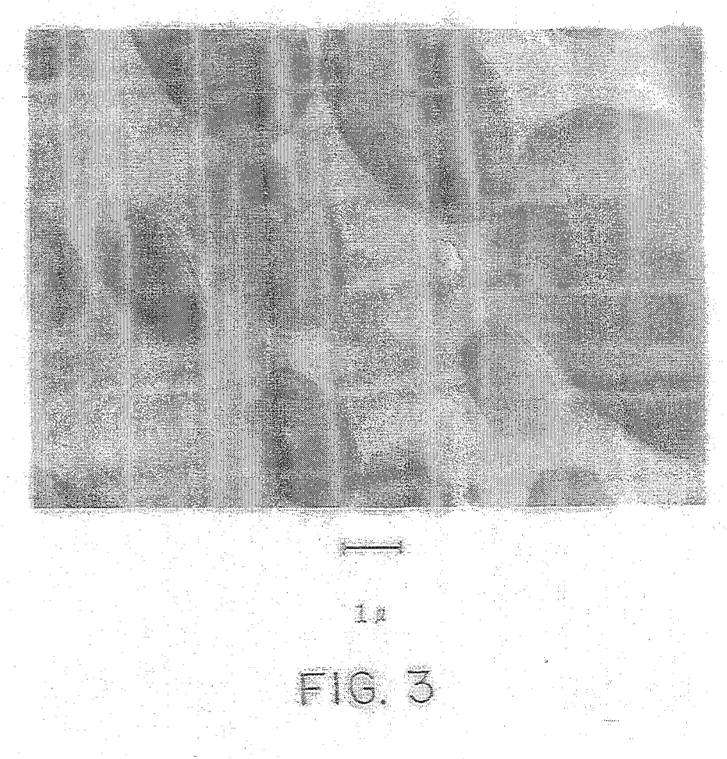

A transmission electron micrograph of an ultra thin film of the test piece (x 10,000) is shown in FIG. 3.

Comparative Example 2

Graft polymerization was conducted in the same manner as in Example 4 except that a polycarbonate resin having an apparent density of 0.93 g/cm$^3$ and an average particle diameter of 1.1mm was used in place of that in Example 4. The T/H value was 87.0%/5.5%.

Comparative Example 3

Graft polymerization was conducted in the same manner as in Example 4 except that a polycarbonate resin having an apparent density of 0.85 g/cm$^3$, Mv of 16,000 and no unsaturated terminal group (Trade name Iupilon H-4000; manufactured by Mitsubishi Gas Chemical Co., Inc.) was used in place of that in Example 4. The T/H value was 67.0%/33.0%.

According to the present invention, it is not necessary to use vinyl monomer as a solvent, and an amount of the vinyl monomer depends on a grafting ratio. There is no need for recovering unreacted vinyl monomer. After the polymerization, the resulting polymer is only separated from water, and water is not recovered for reuse.

According to the present invention, many kinds of vinyl polymer grafted polycarbonate resin can be obtained with commercial advantages. These grafted polymers are useful for optical materials.

What is claimed is:

1. A process for producing a grafted polycarbonate resin for optical use which comprises:
adding to an aqueous suspension of an aromatic polycarbonate resin having radical-polymerizable unsaturated terminal group on a molecule wherein the aromatic polycarbonate resin has an average particle diameter of 0.1 to 5 mm and an apparent density of 0.2 to 0.85 g/cm$^3$, 50 to 150 parts by weight of a vinyl monomer on the basis of 100 parts by weight of the polycarbonate resin and 0.5 to 5 parts by weight of a radical-polymerization initiator on the basis of 100 parts by weight of the vinyl monomer, heating the aqueous suspension for 15 minutes to 4 hours at a lower temperature by 5° to 20° C. than the decomposition temperature for a half-life period of 10 hours of the radical-polymerization initiator, thereby impregnating the polycarbonate resin with the vinyl monomer and the radical-polymerization initiator, then elevating the temperature to the range of from a lower temperature by 5° C. to a higher temperature by 30° C. than the decomposition temperature for a half-life period of 10 hours of the radical-polymerization initiator, thereby conducting a graft-polymerization reaction of polycarbonate and vinyl monomer for 1 to 20 hours to obtain 90% by weight or more of conversion of vinyl monomer.

2. A process according to claim 1, wherein the aromatic polycarbonate resin has a viscometric average molecular weight of 12,000 to 22,000.

3. A process according to claim 1, wherein the aromatic polycarbonate resin has an apparent density of 0.5 to 0.85 g/cm$^3$.

4. A process according to claim 1, wherein the vinyl monomer is at least one member selected from the group consisting of vinyl aromatic monomers, methacrylic ester monomers, acrylic ester monomers, metacrylonitrile, vinyl ester monomers, maleimide, and fumaric acid ester.

5. The process according to claim 1, wherein the polycarbonate resin having radical-polymerizable unsaturated terminal is a polycarbonate having at least one member selected from the group consisting of an isopropenylphenol, an eugenol, an o-allylphenol, and a 2-hydroxy-ethylmethacrylate on a terminal.

6. A process according to claim 1, wherein an organic sulfur compound is used as a molecular weight-controlling agent.

7. A process for producing a grafted polycarbonate resin for optical use which comprises:

adding to an aqueous suspension of an aromatic polycarbonate resin having radical-polymerizable unsaturated terminal group on a molecule wherein the aromatic polycarbonate resin has an average particle diameter of 0.1 to 5 mm and an apparent density of 0.2 to 0.85 g/cm$^3$, 50 to 150 parts by weight of a vinyl monomer on the basis of 100 parts by weight of the polycarbonate resin and 0.5 to 5 parts by weight of a radical-polymerization initiator on the basis of 100 parts by weight of the vinyl monomer, heating the aqueous suspension for 15 minutes to 4 hours at a lower temperature by 5° to 20° C. than the decomposition temperature for a half-life period of 10 hours of the radical-polymerization initiator, thereby impregnating the polycarbonate resin with the vinyl monomer and the radical-polymerization initiator, then elevating the temperature to the range of from a lower temperature by 5° C. to a higher temperature by 30° C. than the decomposition temperature for a half-life period of 10 hours of the radical-polymerization initiator, thereby conducting a graft-polymerization reaction of polycarbonate and vinyl monomer for 1 to 20 hours to obtain 90% by weight or more conversion of vinyl monomer, conducting solid-liquid separation of thus obtained grafted polycarbonate, subsequently melt-kneading the pelletize polycarbonate at a temperature of 200° to 350° C.

8. The process according to claim 6 wherein the organic sulfur compound is an aliphatic compound having 1 to 30 carbon atoms.

9. The process according to claim 6 wherein the organic sulfur compound is an aromatic compound.

10. The process according to claim 6 wherein the organic sulfur compound is an aliphatic mercaptan.

* * * * *